US010025529B2

(12) United States Patent
Liu et al.

(10) Patent No.: US 10,025,529 B2
(45) Date of Patent: Jul. 17, 2018

(54) HEARTBEAT-BASED DATA SYNCHRONIZATION APPARATUS AND METHOD, AND DISTRIBUTED STORAGE SYSTEM

(71) Applicant: Huawei Technologies Co., Ltd., Shenzhen, Guangdong (CN)

(72) Inventors: Cunwei Liu, Shenzhen (CN); Guojun Wu, Shenzhen (CN); Xihua Huang, Shenzhen (CN); Xuefeng Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/583,687

(22) Filed: May 1, 2017

(65) Prior Publication Data
US 2017/0235492 A1    Aug. 17, 2017

Related U.S. Application Data

(63) Continuation of application No. PCT/CN2016/097244, filed on Aug. 29, 2016.

(30) Foreign Application Priority Data

Feb. 5, 2016  (CN) .......................... 2016 1 0082068

(51) Int. Cl.
*G06F 3/06*       (2006.01)
*G06F 11/00*     (2006.01)
(Continued)

(52) U.S. Cl.
CPC .............. *G06F 3/065* (2013.01); *G06F 3/061* (2013.01); *G06F 3/067* (2013.01); *G06F 3/0629* (2013.01);
(Continued)

(58) Field of Classification Search
CPC ...... G06F 3/061; G06F 3/0629; G06F 3/0653; G06F 3/065; G06F 3/067; G06F 11/00;
(Continued)

(56) References Cited

U.S. PATENT DOCUMENTS 6,651,242 B1   11/2003 Hebbagodi et al.
7,185,236 B1    2/2007 Moser et al.
(Continued)

FOREIGN PATENT DOCUMENTS

CN    104765661 A    7/2015
CN    104994168 A    10/2015

OTHER PUBLICATIONS

Becker et al., "Leader Election for Replicated Services Using Application Scores", Proceedings of the 12th International Middleware Conference (Middleware 2011), Lecture Notes in Computer Science, vol. 7049, Dec. 2011, pp. 289-308.
Bertier et al., "Implementation and performance evaluation of an adaptable failure detector", Proceedings of the International Conference on Dependable Systems and Networks (DSN 2002), Jun. 2002, pp. 354-363.
(Continued)

*Primary Examiner* — Aracelis Ruiz

(57) ABSTRACT

A heartbeat-based data synchronization method is disclosed. The method is applied to a distributed storage system, and at least one data block group is stored in the distributed storage system. The distributed storage system includes multiple storage devices, one device in the multiple storage devices is a primary device for storing the data block group, and other devices are secondary devices for storing the data block group. The primary device performs the method. The primary device obtains access status information of the data block group, determines a heartbeat time of the data block group according to the access status information of the data block group, and sends a data synchronization instruction to the secondary device according to the heartbeat time of the data block group, where the data synchronization instruction is used to instruct the secondary device to synchronize data.

17 Claims, 8 Drawing Sheets

(51) Int. Cl.
*G06F 11/14* (2006.01)
*G06F 17/30* (2006.01)
*H04L 12/26* (2006.01)
*H04L 29/06* (2006.01)
*H04L 29/08* (2006.01)
*G06F 11/20* (2006.01)

(52) U.S. Cl.
CPC ............ *G06F 3/0653* (2013.01); *G06F 11/00* (2013.01); *G06F 11/1425* (2013.01); *G06F 11/202* (2013.01); *G06F 17/30197* (2013.01); *G06F 17/30283* (2013.01); *G06F 17/30575* (2013.01); *H04L 43/10* (2013.01); *H04L 43/103* (2013.01); *H04L 67/1095* (2013.01); *H04L 67/1097* (2013.01); *H04L 67/145* (2013.01); *H04L 69/28* (2013.01)

(58) Field of Classification Search
CPC ............ G06F 11/202; G06F 11/1425; G06F 17/30197; G06F 17/30575; G06F 17/30283; H04L 43/10; H04L 43/103; H04L 67/1095; H04L 67/1097; H04L 67/145; H04L 69/28
See application file for complete search history.

(56) References Cited

U.S. PATENT DOCUMENTS

| | | | |
|---|---|---|---|
| 7,647,329 | B1 | 1/2010 | Fischman et al. |
| 8,583,101 | B1* | 11/2013 | Xu .................. H04W 52/0216 455/422.1 |
| 2005/0050392 | A1* | 3/2005 | Baba .................. G06F 11/2023 714/25 |
| 2009/0063886 | A1* | 3/2009 | Arimilli .................. G06F 1/12 713/400 |
| 2014/0006357 | A1 | 1/2014 | Davis et al. |
| 2015/0074178 | A1 | 3/2015 | Hong et al. |
| 2015/0280959 | A1 | 10/2015 | Vincent |

OTHER PUBLICATIONS

Ongaro et al., "In Search of an Understandable Consensus Algorithm", Proceedings of the 2014 USENIX Annual Technical Conferences, Jun. 2014, pp. 305-319.

Sergent et al., "Impact of a Failure Detection Mechanism on the Performance of Consensus", Proceedings of the 2001 Pacific Rim International Symposium on Dependable Computing, Dec. 2001, pp. 137-145.

Shi et al., "GIRAFFE: A Scalable Distributed Coordination Service for Large-scale Systems", 2014 IEEE International Conference on Cluster Computing (CLUSTER), Sep. 2014, pp. 38-47.

* cited by examiner

HEARTBEAT-BASED DATA SYNCHRONIZATION APPARATUS AND METHOD, AND DISTRIBUTED STORAGE SYSTEM

CROSS-REFERENCE TO RELATED APPLICATIONS

This application is a continuation of International Application No. PCT/CN2016/097244, filed on Aug. 29, 2016, which claims priority to Chinese Patent Application No. 201610082068.8, filed on Feb. 5, 2016. The disclosures of the aforementioned applications are hereby incorporated by reference in their entireties.

TECHNICAL FIELD

The present application relates to the field of data synchronization technologies, and in particular, to a heartbeat-based data synchronization apparatus and method, and a distributed storage system.

BACKGROUND

In the field of data synchronization technologies, a Raft consistency algorithm is widely applied to a distributed storage system.

Currently, data in a distributed storage system based on the Raft consistency algorithm is divided into multiple data block groups. Each data block group includes multiple same data blocks separately stored in different storage devices. During implementation of the Raft consistency algorithm, data is synchronized by using a data block group as a unit. Specifically, for a data block group, storage devices in which data blocks of the data block group are located first elect a primary device for the data block group. Correspondingly, another device is a secondary device for the data block group. The primary device is responsible for processing interaction with a client. When receiving a read/write instruction sent by the client, the primary device records the read/write instruction as a log, and sends a data synchronization instruction that includes the log to each secondary device according to a fixed heartbeat time. Each secondary device synchronizes data according to the data synchronization instruction. If there is no to-be-sent log when the heartbeat time elapses, the primary device needs to send a heartbeat signal that includes no data synchronization instruction to each secondary device, so as to determine that a connection is normal.

In a process of implementing the present application, the inventor finds that the prior art has at least the following problem:

In an existing Raft consistency algorithm, heartbeat times of various data block groups are a fixed value, but read/write frequencies of the data block groups are not even. The fixed value is generally set to be relatively small, so as to ensure that all data blocks in a data block group of a relatively high read/write frequency can be synchronized in a timely manner. Consequently, a signal also needs to be frequently received and sent between all storage devices in which a data block group of a relatively low read/write frequency is located, thereby causing relatively large system overheads, and affecting read/write performance of a storage system.

SUMMARY

Embodiments of the present application provide an apparatus, a method, and a distributed storage system, to resolve a prior-art problem that a signal also needs to be frequently received and sent between all storage devices in which a data block group of a relatively low read/write frequency is located, thereby causing relatively large system overheads, and affecting read/write performance of a storage system. The technical solutions are as follows:

At least one data block group is stored in the distributed storage system, and the distributed storage system includes multiple storage devices. One device in the multiple storage devices is a primary device for storing the data block group, and other devices are secondary devices for storing the data block group. The distributed storage system may further include a coordination device, and the coordination device is connected to all storage devices in the distributed storage system.

According to a first aspect, a heartbeat-based data synchronization method is provided, and the method includes:

obtaining, by the primary device, access status information of the data block group; determining, by the primary device, a heartbeat time of the data block group according to the access status information of the data block group; and sending, by the primary device, a data synchronization instruction to the secondary device according to the heartbeat time of the data block group, where the data synchronization instruction is used to instruct the secondary device to synchronize data.

In this solution of the embodiments of the present application, for each data block group, a heartbeat time of the data block group is adaptively determined according to related information such as a read/write frequency of the data block group. A problem that a signal needs to be frequently received and sent between all storage devices in which a data block group is located, thereby causing relatively large system overheads, and affecting read/write performance of a storage system in an existing Raft consistency algorithm is resolved. Therefore, system overheads of a distributed storage system are reduced, and read/write performance of the storage system is improved.

With reference to the first aspect, in a first possible implementation manner of the first aspect, the access status information of the data block group includes a read frequency and a write frequency of the data block group.

With reference to the first aspect or the first possible implementation manner of the first aspect, in a second possible implementation manner of the first aspect, the determining, by the primary device, a heartbeat time of the data block group according to the access status information of the data block group includes: scoring, by the primary device, the access status information according to a preset first scoring rule, so as to obtain a first reference score; and determining, by the primary device, the heartbeat time of the data block group according to the first reference score. A manner for determining the heartbeat time according to at least two pieces of information including the read frequency and the write frequency is provided, so as to adaptively determine the heartbeat time of the data block group.

With reference to the first possible implementation manner of the first aspect, in a third possible implementation manner of the first aspect, the determining, by the primary device, a heartbeat time of the data block group according to the access status information of the data block group includes: separately scoring, by the primary device, the read frequency and the write frequency according to a first scoring rule; using, by the primary device, a sum of scores for the read frequency and the write frequency as a first reference score; and determining, by the primary device, the heartbeat time of the data block group according to the first reference score.

With reference to the first possible implementation manner of the first aspect, in a fourth possible implementation manner of the first aspect, the determining, by the primary device, a heartbeat time of the data block group according to the access status information of the data block group includes: obtaining, by the primary device, a preset reference time and a first weight corresponding to the access status information; and calculating, by the primary device, the heartbeat time of the data block group according to the access status information, the reference time, and the first weight. A manner for determining the heartbeat time according to at least two pieces of information including the read frequency and the write frequency is provided, so as to adaptively determine the heartbeat time of the data block group.

With reference to the fourth possible implementation manner of the first aspect, in a fifth possible implementation manner of the first aspect, the determining, by the primary device, a heartbeat time of the data block group according to the access status information of the data block group includes:

calculating the heartbeat time according to the following formulas:

heartbeatTime=Time/(weight$R \times R$+weight$W \times W$); and weight$R$+weight$W$=1, where heartbeatTime is the heartbeat time, Time is the reference time, R is a value of the read frequency, W is a value of the write frequency, weightR is a weight corresponding to the read frequency, and weightW is a weight corresponding to the write frequency.

In this solution of the embodiments of the present application, a primary device determines a heartbeat time of a data block group according to access status information of the data block group. Impact imposed by different pieces of access status information on a whole storage system is comprehensively considered. The heartbeat time is more appropriately configured from a perspective of an actual data access situation. Therefore, a problem that a "heartbeat storm" is caused because a signal is frequently received and sent between all storage devices in which a data block group is located in a short time in an existing multi-Raft system, thereby causing relatively large system overheads, and affecting read/write performance of a storage system is resolved.

With reference to any one of the first aspect, or the first to the fifth possible implementation manners of the first aspect, in a sixth possible implementation manner of the first aspect, the method further includes: sending, by the primary device, the heartbeat time of the data block group to the secondary device, so that the secondary device sets an election timeout time according to the heartbeat time.

In this solution of the embodiments of the present application, a primary device sends a heartbeat time of a data block group to a secondary device, so that the secondary device sets an election timeout time according to the heartbeat time. Impact imposed by the heartbeat time on the election timeout time is considered. A primary device that is most helpful to play system overall performance is elected to lead data synchronization, so as to improve overall read/write performance of a storage system.

With reference to any one of the first aspect, or the first to the sixth possible implementation manners of the first aspect, in a seventh possible implementation manner of the first aspect, the distributed storage system further includes a coordination device connected to the multiple storage devices, and the method further includes: sending, by the primary device, the heartbeat time of the data block group to the coordination device; receiving, by the primary device, a corrected heartbeat time returned by the coordination device; and sending, by the primary device, a data synchronization instruction to the secondary device according to the corrected heartbeat time.

In this solution of the embodiments of the present application, a heartbeat time of each data block group is corrected according to a read/write frequency of each data block group. Therefore, the heartbeat time of each data block group in a storage system is optimized as a whole, and read/write performance of the storage system is further improved.

According to a second aspect, a heartbeat-based data synchronization method is provided, and the method includes: receiving, by the secondary device, a data synchronization instruction sent by the primary device according to a heartbeat time of the data block group, where the primary device obtains access status information of the data block group, and determines the heartbeat time according to the access status information of the data block group; and synchronizing, by the secondary device, data according to the data synchronization instruction.

In this solution of the embodiments of the present application, a heartbeat time of a data block group is adaptively determined according to related information such as a read/write frequency of the data block group. Data synchronization between devices is performed according to the determined heartbeat time. A problem that a signal needs to be frequently received and sent between all storage devices in which a data block group is located, thereby causing relatively large system overheads, and affecting read/write performance of a storage system in an existing Raft consistency algorithm is resolved. Therefore, system overheads of a distributed storage system are reduced, and read/write performance of the storage system is improved.

With reference to the second aspect, in a first possible implementation manner of the second aspect, the access status information of the data block group includes a read frequency and a write frequency of the data block group.

With reference to the first possible implementation manner of the second aspect, in a second possible implementation manner of the second aspect, the method further includes: receiving, by the secondary device, the heartbeat time sent by the primary device; setting, by the secondary device, an election timeout time according to the heartbeat time; and initiating, by the secondary device, a primary device election in all other storage devices of the multiple storage devices when the secondary device does not receive, in the election timeout time, any signal sent by the primary device.

In this solution of the embodiments of the present application, a secondary device sets an election timeout time according to a heartbeat time. Impact imposed by the heartbeat time on the election timeout time is considered. A primary device that is most helpful to play system overall performance is elected to lead data synchronization, so as to improve overall read/write performance of a storage system.

With reference to the second possible implementation manner of the second aspect, in a third possible implementation manner of the second aspect, the setting, by the secondary device, an election timeout time according to the heartbeat time includes: scoring, by the secondary device, the access status info illation according to a preset second scoring rule, so as to obtain a second reference score; determining, by the secondary device, a first timeout coefficient of the data block group according to the second reference score; and setting, by the secondary device, a product of multiplying the first timeout coefficient by the heartbeat time as the election timeout time.

With reference to the second possible implementation manner of the second aspect, in a fourth possible implementation manner of the second aspect, the setting, by the secondary device, an election timeout time according to the heartbeat time includes: obtaining, by the secondary device, a preset reference coefficient and a second weight corresponding to the access status information; calculating, by the secondary device, a second timeout coefficient of the data block group according to the access status information, the reference coefficient, and the second weight; and setting, by the secondary device, a product of multiplying the second timeout coefficient by the heartbeat time as the election timeout time.

With reference to the fourth possible implementation manner of the second aspect, in a fifth possible implementation manner of the second aspect, the setting, by the secondary device, an election timeout time according to the heartbeat time includes:

setting the election timeout time according to the following formulas:

$$OverTime=(weightR \times R+weightW \times W+Reference) \times heartbeatTime; \text{ and}$$

$$weightR+weightW=1, \text{ where}$$

OverTime is the election timeout time, heartbeatTime is the heartbeat time, Reference is the reference coefficient, R is a value of the read frequency, W is a value of the write frequency, weightR is a weight corresponding to the read frequency, and weightW is a weight corresponding to the write frequency.

In this solution of the embodiments of the present application, a primary device determines a heartbeat time of a data block group according to access status information of the data block group, and an election timeout time is set according to the heartbeat time. Impact imposed by different pieces of access status information on a whole storage system is comprehensively considered. The election timeout time is more appropriately configured from a perspective of an actual data access situation, so as to improve overall read/write performance of the storage system.

According to a third aspect, a heartbeat-based data synchronization method is provided, and the method includes: collecting, by the coordination device, statistics on access status information of the data block group, and receiving a heartbeat time that is of the data block group and sent by the primary device, where the primary device obtains the access status information of the data block group, and determines the heartbeat time according to the access status information of the data block group; determining, by the coordination device, an importance level of the data block group according to the access status information of the data block group; correcting, by the coordination device, the heartbeat time according to the importance level of the data block group; and returning, by the coordination device, a corrected heartbeat time to the primary device.

In this solution of the embodiments of the present application, a coordination device determines an importance level of a data block group according to access status information of the data block group, and corrects a heartbeat time according to the importance level of the data block group. A heartbeat time is adjusted as a whole from a perspective of a whole system, so as to more appropriately allocate resources, and improve overall read/write performance of a storage system.

According to a fourth aspect, a network device is provided, and the network device includes: a processor, a network interface, a memory, and a bus, where the memory and the network interface are separately connected to the processor by using the bus; the processor is configured to execute an instruction stored in the memory; and the processor executes the instruction to implement the heartbeat-based data synchronization method provided in the first aspect or any possible implementation manner of the first aspect.

According to a fifth aspect, a network device is provided, and the network device includes: a processor, a network interface, a memory, and a bus, where the memory and the network interface are separately connected to the processor by using the bus; the processor is configured to execute an instruction stored in the memory; and the processor executes the instruction to implement the heartbeat-based data synchronization method provided in the second aspect or any possible implementation manner of the second aspect.

According to a sixth aspect, a network device is provided, and the network device includes: a processor, a network interface, a memory, and a bus, where the memory and the network interface are separately connected to the processor by using the bus; the processor is configured to execute an instruction stored in the memory; and the processor executes the instruction to implement the heartbeat-based data synchronization method provided in the third aspect.

According to a seventh aspect, an embodiment of the present application provides a heartbeat-based data synchronization apparatus, where the heartbeat-based data synchronization apparatus includes at least one unit, and the at least one unit is configured to implement the heartbeat-based data synchronization method provided in the first aspect or any possible implementation manner of the first aspect.

According to an eighth aspect, an embodiment of the present application provides a heartbeat-based data synchronization apparatus, where the heartbeat-based data synchronization apparatus includes at least one unit, and the at least one unit is configured to implement the heartbeat-based data synchronization method provided in the second aspect or any possible implementation manner of the second aspect.

According to a ninth aspect, an embodiment of the present application provides a heartbeat-based data synchronization apparatus, where the heartbeat-based data synchronization apparatus includes at least one unit, and the at least one unit is configured to implement the heartbeat-based data synchronization method provided in the third aspect.

Technical effects obtained by the fourth to the ninth aspects of the embodiments of the present application are similar to technical effects obtained by the technical solutions corresponding to the first to the third aspects, and details are not described herein.

In conclusion, the technical solutions provided in the embodiments of the present application bring the following beneficial effects:

A primary device obtains access status information of a data block group; the primary device determines a heartbeat time of the data block group according to the access status information of the data block group; the primary device sends a data synchronization instruction to a secondary device according to the heartbeat time of the data block group, where the data synchronization instruction is used to instruct the secondary device to synchronize data. A problem that a signal needs to be frequently received and sent between all storage devices in which a data block group is located, thereby causing relatively large system overheads, and affecting read/write performance of a storage system in an existing Raft consistency algorithm is resolved. Therefore, system overheads of a distributed storage system are reduced, and read/write performance of the storage system is improved.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DETAILED DESCRIPTION

To make the objectives, technical solutions, and advantages of the present application clearer, the following further describes the embodiments of the present application in detail with reference to the accompanying drawings.

Figure 1A:
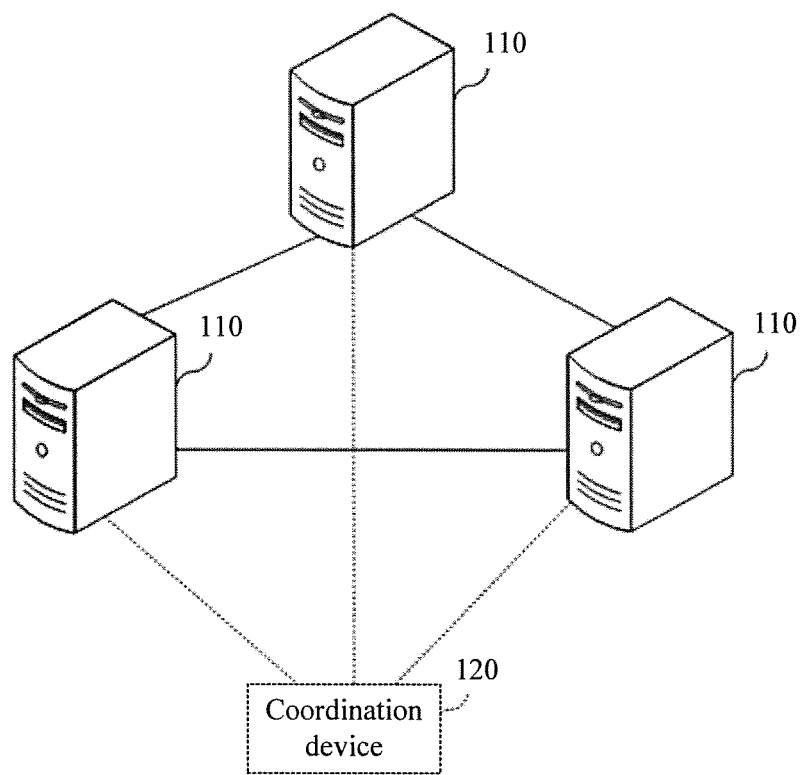
FIG. 1A is a schematic structural diagram of an example of a distributed storage system according to an embodiment of the present application.

Referring to FIG. 1A, FIG. 1A shows a schematic structural diagram of an example of a distributed storage system according to an embodiment of the present application. The distributed storage system includes multiple storage devices 110.

Multiple data block groups are stored in the distributed storage system, each data block group includes multiple same data blocks, and multiple data blocks in a same data block group are stored in different storage devices. In multiple storage devices for storing a data block group, one storage device is a primary device for storing the data block group, and other storage devices are secondary devices for storing the data block group. The primary device is responsible for processing interaction with a client.

In this embodiment of the present application, a primary device of a data block group may obtain access status information of the data block group, determine a heartbeat time of the data block group according to the access status information of the data block group, and send a data synchronization instruction to a secondary device according to the heartbeat time of the data block group. The secondary device of the data block group is configured to synchronize data according to the data synchronization instruction, so that multiple data blocks keep consistent.

Optionally, the distributed storage system further includes a coordination device 120. The coordination device 120 is connected to and communicates with the multiple storage devices 110 by using a wired or wireless network.

Figure 1B:
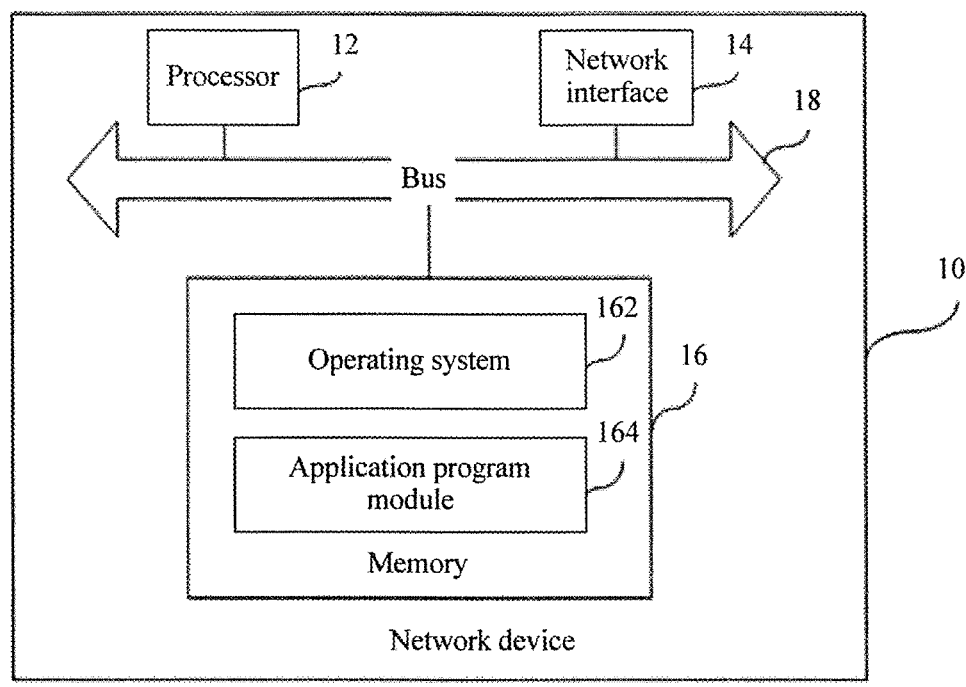
FIG. 1B is a schematic structural diagram of a network device involved in the embodiment shown in FIG. 1A.

Referring to FIG. 1B, FIG. 1B shows a schematic structural diagram of an example of a network device involved in this embodiment of the present application. The network device 10 may be the foregoing storage device 110 or coordination device 120, and the network device 10 includes a processor 12 and a network interface 14.

The processor 12 includes one or more processing cores. The processor 12 performs various functional applications and data processing by running a software program and a module.

There may be multiple network interfaces 14, and the network interface 14 is configured to communicate with another storage device or network device.

Optionally, the network device 10 further includes a component such as a memory 16 or a bus 18. The memory 16 and the network interface 14 are separately connected to the processor 12 by using the bus 18.

The memory 16 may be configured to store a software program and a module. Specifically, the memory 16 may store an operating system 162, and an application program module 164 needed by at least one function. The operating system 162 may be a real-time operating system (Real Time eXecutive, RTX), or an operating system such as LINUX, UNIX, WINDOWS, or OS X.

Figure 1C:
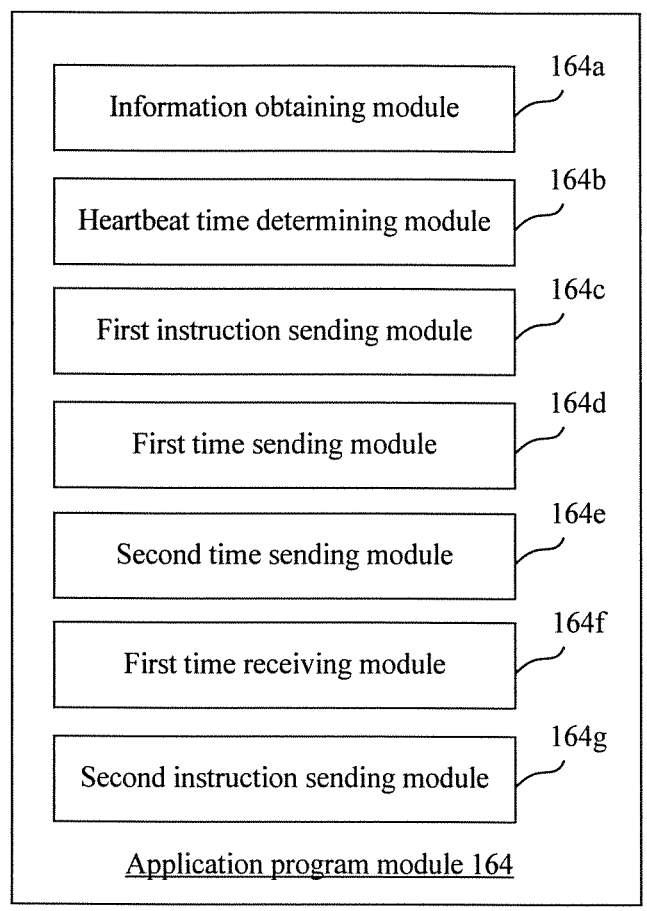
FIG. 1C is a schematic diagram of an application program module involved in the embodiment shown in FIG. 1A.

Referring to FIG. 1C, FIG. 1C shows a schematic diagram of an example of an application program module involved in this embodiment of the present application. As shown in FIG. 1C, when the network device 10 is a storage device, and the storage device is a primary device of a data block group, the application program module 164 may be an information obtaining module 164a, a heartbeat time determining module 164b, a first instruction sending module 164c, a first time sending module 164d, a second time sending module 164e, a first time receiving module 164f, and a second instruction sending module 164g.

The information obtaining module 164a obtains access status information of the data block group.

The heartbeat time determining module 164b determines a heartbeat time of the data block group according to the access status information of the data block group.

The first instruction sending module 164c sends a data synchronization instruction to a secondary device according to the heartbeat time of the data block group.

The first time sending module 164d sends the heartbeat time of the data block group to the secondary device.

The second time sending module 164e sends the heartbeat time of the data block group to the coordination device.

The first time receiving module 164f receives a corrected heartbeat time returned by the coordination device.

The second instruction sending module 164g sends a data synchronization instruction to the secondary device according to the corrected heartbeat time.

Figure 1D:
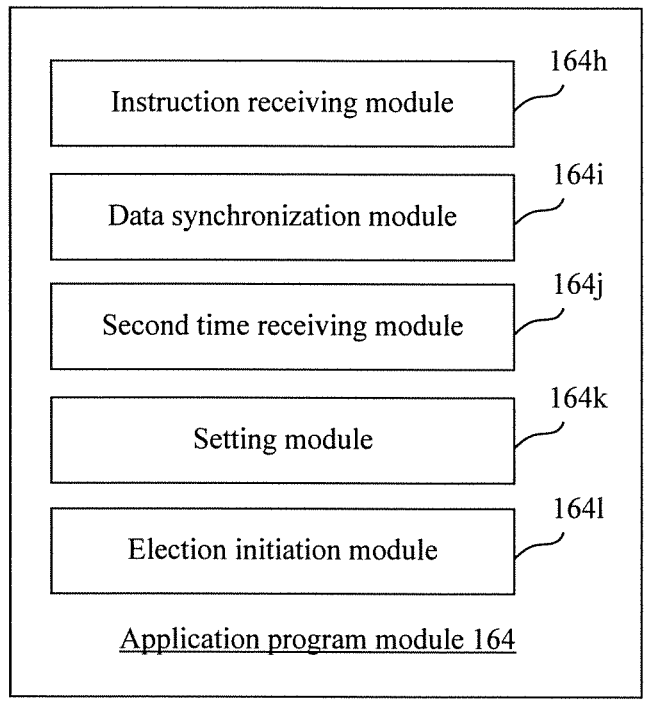
FIG. 1D is a schematic diagram of another application program module involved in the embodiment shown in FIG. 1A.

Referring to FIG. 1D, FIG. 1D shows a schematic diagram of an example of another application program module involved in this embodiment of the present application. When the network device 10 is a secondary device of the data block group, the application program module 164 may be an instruction receiving module 164h, a data synchronization module 164i, a second time receiving module 164j, a setting module 164k, and an election initiation module 164l.

The instruction receiving module 164h receives a data synchronization instruction sent by a primary device according to a heartbeat time of the data block group, where the primary device obtains access status information of the data block group, and determines the heartbeat time according to the access status information of the data block group.

The data synchronization module 164i synchronizes data according to the data synchronization instruction, so that multiple data blocks keep consistent.

The second time receiving module 164j receives the heartbeat time sent by the primary device.

The setting module 164k sets an election timeout time according to the heartbeat time.

The election initiation module 164l initiates a primary device election in all other storage devices of the multiple storage devices when the secondary device does not receive, in the election timeout time, any signal sent by the primary device.

Figure 1E:
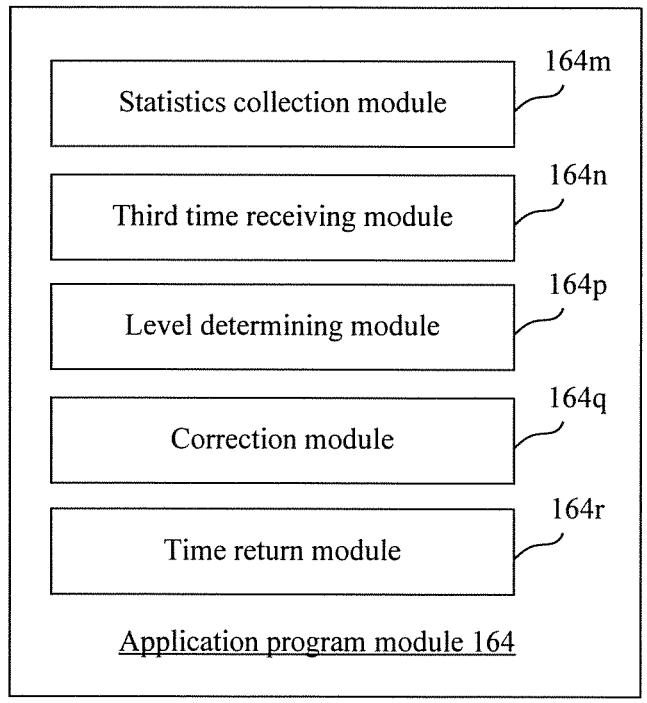
FIG. 1E is a schematic diagram of still another application program module involved in the embodiment shown in FIG. 1A.

Referring to FIG. 1E, FIG. 1E shows a schematic diagram of an example of still another application program module involved in this embodiment of the present application. When the network device 10 is the coordination device 120, the application program module 164 may be a statistics collection module 164m, a third time receiving module 164n, a level determining module 164p, a correction module 164q, and a time return module 164r.

The statistics collection module 164m collects statistics on access status information of a data block group.

The third time receiving module 164n receives a heartbeat time that is of the data block group and sent by a primary device, where the primary device obtains the access status information of the data block group, and determines the heartbeat time according to the access status information of the data block group.

The level determining module 164p determines an importance level of the data block group according to the access status information of the data block group.

The correction module 164q corrects the heartbeat time according to the importance level of the data block group.

The time return module 164r returns a corrected heartbeat time to the primary device.

Figure 2:
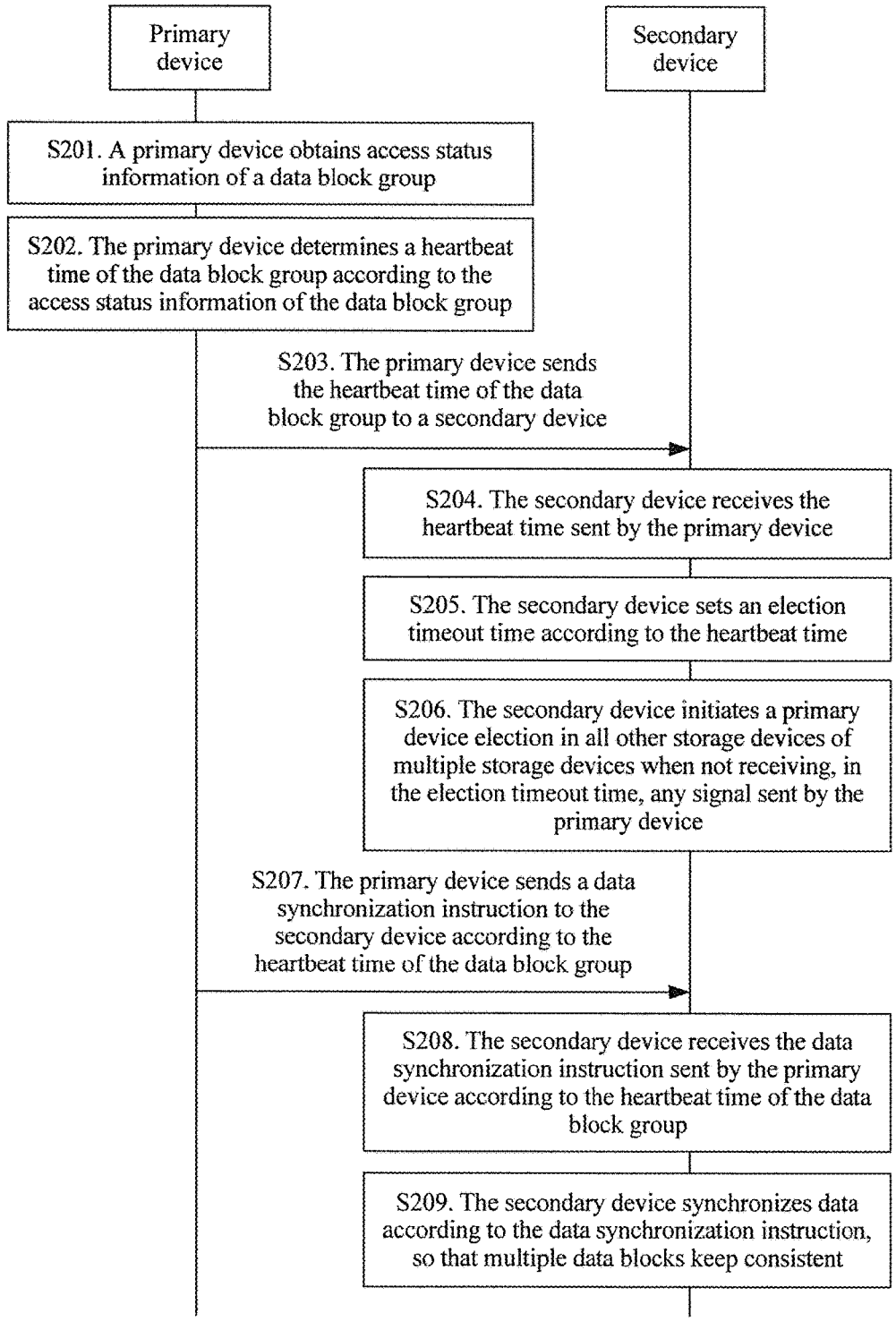
FIG. 2 is a method flowchart of an example of a heartbeat-based data synchronization method according to an embodiment of the present application.

FIG. 2 is a method flowchart of an example of a heartbeat-based data synchronization method according to an embodiment of the present application. The method may be applied to the storage system shown in FIG. 1 in which at least one data block group is stored. As shown in FIG. 2, the heartbeat-based data synchronization method may include the following steps.

Step 201: A primary device obtains access status information of a data block group.

The access status information of the data block group may include a read frequency and a write frequency of the data block group.

The read frequency of the data block group is a quantity of times that the primary device in the storage system receives a read operation on a data block in the data block group in a period of time. The write frequency of the data block group is a quantity of times that the primary device in the storage system receives a write operation on a data block in the data block group in a period of time.

A distributed storage system based on a Raft consistency algorithm is used as an example. For a data block group, a client generally performs a read/write operation only on a data block stored in a primary device corresponding to the data block group. Therefore, a quantity of times that a data read or write operation is performed on a primary device in a period of time reflects use frequency of a data block group to some extent. When being a primary device of a data block group, a storage device may collect statistics on access status information such as a read frequency or a write frequency of the data block group in a period of time.

Optionally, the access status information of the data block group may further include working status information of each storage device that stores the data block group. For example, the access status information of the data block group may further include a data throughput, CPU (Central Processing Unit) usage, memory usage, an I/O (Input/Output) occupancy rate, or the like of each storage device that stores the data block group.

In the distributed storage system, information such as a data throughput, CPU usage, memory usage, or an I/O occupancy rate of a storage device may reflect frequency that the storage device receives a data synchronization instruction or a heartbeat signal. For example, if a data throughput, CPU usage, memory usage, or an I/O occupancy rate of a storage device is large, it reflects that the storage device frequently receives a data synchronization instruction or a heartbeat signal. On the contrary, if a data throughput, CPU usage, memory usage, or an I/O occupancy rate of a storage device is small, it reflects that the storage device rarely receives a data synchronization instruction or a heartbeat signal.

The processor 12 in the network device 10 shown in FIG. 1B may run the information obtaining module 164a to implement this step.

Step 202: The primary device determines a heartbeat time of the data block group according to the access status information of the data block group.

If a heartbeat time corresponding to a data block group is longer, a quantity of times of communication in a unit time between a primary device and a secondary device of the data block group in the distributed storage system is smaller. On the contrary, if the heartbeat time is shorter, the quantity of times of communication in a unit time between the primary device and the secondary device of the data block group is larger. For a data block group of a relatively low read/write frequency, if a quantity of times of data synchronization in a unit time between a primary device and a secondary device of the data block group keeps in a relatively low level, a synchronization performance requirement of each data block in the data block group may be satisfied. Therefore, in this embodiment of the present application, an independent heartbeat time may be separately set for each data block group, so that a quantity of times of communication in a unit time between a primary device and a secondary device of a data block group of a relatively small quantity of read/write times keeps in a relatively low level. In this way, the quantity of times of communication in a unit time between the primary device and the secondary device of the data block group is reduced as far as possible while synchronization performance of the data block group is ensured, thereby reducing system overheads of the distributed storage system, and improving read/write performance of the storage system.

Optionally, the step in which the primary device determines a heartbeat time of the data block group according to the access status information of the data block group may include the following two possible implementation manners:

(1) The primary device scores the access status information according to a preset first scoring rule, so as to obtain a first reference score; and determines the heartbeat time of the data block group according to the first reference score.

In the foregoing possible implementation manner, an example in which the access status information is the read frequency and the write frequency of the data block group is used for description. The primary device first scores the read frequency and the write frequency of the data block group according to the preset first scoring rule, uses a sum of scores for the read frequency and the write frequency as the first reference score, and determines the heartbeat time of the data block group according to the first reference score.

The first scoring rule may be a scoring rule pre-designated for the access status information of the data block group. For example, for the read frequency and the write frequency, the scoring rule may be a rule shown in Table 1 below.

TABLE 1

| First scoring rule | Read/write frequency | Data throughput | CPU usage | Memory usage | I/O occupancy rate |
|---|---|---|---|---|---|
| One point | Less than 50 Hz | Less than 800 KB/s | Less than 20% | Less than 35% | Less than 30% |
| Two points | 50-100 Hz | 800-2000 KB/s | 20%-80% | 35%-70% | 30%-70% |
| Three points | Greater than 100 Hz | Greater than 2000 KB/s | Greater than 80% | Greater than 70% | Greater than 70% |

A sum of scores for the access status information of the data block group that are determined according to the first scoring rule is used as the first reference score. For example, when the access status information of the data block group is a read frequency of 70 Hz and a write frequency of 45 Hz, if scoring is performed according to the first scoring rule indicated in the foregoing table, the first reference score is a sum of two points corresponding to the read frequency of 70 Hz and one point corresponding to the write frequency of 45 Hz. Therefore, the first reference score is three points.

Then, the primary device determines the heartbeat time of the data block group according to the first reference score of three points. A determining manner may be determining according to a value of the first reference score. For a determining manner that may be implemented, refer to Table 2.

TABLE 2

| First reference score | Heartbeat time |
|---|---|
| 1-3 points | 5 ms |
| 4-7 points | 2 ms |
| More than 7 points | 1 ms |

According to a correspondence between a first reference score and a heartbeat time that is shown in Table 2, the primary device finds a heartbeat time of 5 ms corresponding to the first reference score of three points, and determines 5 ms as the heartbeat time of the data block group.

It should be specifically noted that Table 1 sets no limitation on the first scoring rule, and Table 1 is only one possible implementation manner of the first scoring rule. In addition, access status information "read/write frequency" in the second column of Table 1 represents that scoring rules corresponding to the read frequency and the write frequency are the same. In an actual application, the scoring rules of the read frequency and the write frequency may be different.

Similarly, Table 2 shows only one correspondence manner between a first reference score and a heartbeat time that may be implemented, and a correspondence manner between a first reference score and a heartbeat time is not limited in this embodiment.

(2) The primary device calculates the heartbeat time of the data block group according to the access status information of the data block group, a reference time, and a first weight. The primary device first obtains the preset reference time and the first weight. Then, the primary device calculates the heartbeat time of the data block group according to the access status information, the reference time, and the first weight.

In the foregoing possible implementation manner, the reference time is a value obtained by means of machine learning, or a preset value. The first weight includes weights respectively corresponding to at least two pieces of information. In heartbeat time calculation, each piece of access status information may be multiplied by a corresponding weight, or each piece of access status information on which scheduled processing is performed is multiplied by a corresponding weight. A processing manner may a manner such as scoring. For example, the access status information is processed according to the first scoring rule, a sum is obtained by adding together obtained products that are respectively corresponding to all pieces of access status information, and then the preset reference time is divided by the sum obtained by adding together the products that are respectively corresponding to all the pieces of access status information, and the corresponding heartbeat time is obtained.

For example, when all the pieces of access status information are the read frequency and the write frequency, in the heartbeat time calculation, the heartbeat time may be calculated according to the following formulas:

$$\mathrm{heartbeatTime}=\mathrm{Time}/(\mathrm{weight}R \times R+\mathrm{weight}W \times W); \text{ and}$$

$$\mathrm{weight}R+\mathrm{weight}W=1.$$

In the foregoing formulas, heartbeatTime is the heartbeat time, Time is the reference time, R is a value of the read frequency, W is a value of the write frequency, weightR is a weight corresponding to the read frequency, and weightW is a weight corresponding to the write frequency. For example, when the reference time is 120 ms, the read frequency is 70 Hz, the weight corresponding to the read frequency is 0.2, the write frequency is 45 Hz, and the weight corresponding to the write frequency is 0.8, the heartbeat time calculated according to the foregoing formulas is 120 ms/(70×0.2+45×0.8)=2.4 ms.

Alternatively, it is assumed that the reference time is 12 ms, the access status information of the data block group includes the following five pieces of data: a read frequency of 70 Hz, a write frequency of 45 Hz, a data throughput of 900 KB/s, CPU usage of 40%, and memory usage of 50%; and weights respectively corresponding to the foregoing five pieces of data are: 0.05, 0.05, 0.1, 0.2, and 0.4. The heartbeat time obtained according to the foregoing calculation method is: 12 ms/(70×0.05+45×0.05+0.9×0.1+0.4×0.2+0.5×0.4), which is approximately equal to 2 ms.

It should be specifically noted that, in this embodiment, the foregoing two specific implementation scenarios are merely used as examples for description of a manner in which the primary device calculates the heartbeat time of the data block group according to the access status information of the data block group, the reference time, and the first weight, and an access status information type and a calculation formula are not limited.

The processor 12 in the network device 10 shown in FIG. 1B may run the heartbeat time determining module 164b to implement this step.

Step 203: The primary device sends the heartbeat time of the data block group to a secondary device.

The processor 12 in the network device 10 shown in FIG. 1B may run the first time sending module 164d to implement this step.

Step 204: The secondary device receives the heartbeat time sent by the primary device.

The processor 12 in the network device 10 shown in FIG. 1B may run the second time receiving module 164j to implement this step.

Step 205: The secondary device sets an election timeout time according to the heartbeat time.

The processor 12 in the network device 10 shown in FIG. 1B may run the setting module 164k to implement this step.

Step 206: The secondary device initiates a primary device election in all other storage devices of multiple storage devices when not receiving, in the election timeout time, any signal sent by the primary device.

A distributed storage system based on a Raft consistency algorithm is used as an example. According to an election manner, the system classifies storage devices into three roles: a Leader, a Follower, and a Candidate. In this solution, the primary device is equivalent to the Leader, and the secondary device is equivalent to the Follower. In the three roles, the Leader is responsible for log synchronization management (that is, data consistency management), processes access of a client that includes a read/write operation, and keeps contact with the Follower by sending a heartbeat. The Follower is responsible for responding to a log synchronization request (that is, a data synchronization instruction) of the Leader and responding to a vote request initiated by the Candidate, and forwards a received client request to the Leader.

The election timeout time is used to trigger the secondary device to initiate a Leader election. Specifically, a timer is set in the secondary device. The secondary device resets the timer each time after receiving a heartbeat signal or a data synchronization instruction sent by the primary device. If a heartbeat signal or a data synchronization instruction is still not received when timing of the timer reaches the election timeout time, the secondary device considers by default that the primary device becomes faulty. In this case, the secondary device re-initiates an election, where an identity of the secondary device that initiates the election changes from the Follower to the Candidate; and initiates a vote request (RequestVote) to another secondary device by using a Remote Procedure Call Protocol (RPC), to request the another secondary device to support the secondary device to become the Leader. If the secondary device receives support votes of more than a half of secondary devices, the identity of the secondary device changes to the Leader.

The secondary device may set the election timeout time in the following three manners:

(1) The secondary device scores the access status information according to a preset second scoring rule, so as to obtain a second reference score; determines a first timeout coefficient of the data block group according to the second reference score; and sets a product of multiplying the first timeout coefficient by the heartbeat time as the election timeout time.

A specific method in which the secondary device scores the access status information according to the preset second scoring rule and obtains the second reference score is similar to a process in which the primary device scores the access status information according to the first scoring rule and obtains the first reference score, and details are not described herein.

In this embodiment of the present application, the secondary device may pre-store a correspondence between each reference score interval and each timeout coefficient. When determining the first timeout coefficient of the data block group according to the second reference score, the secondary device may query a reference score interval to which the second reference score belongs, and query the first timeout coefficient corresponding to the reference score interval in the pre-stored correspondence. A specific form of the correspondence between each reference score interval and each timeout coefficient is not limited in this embodiment of the present application. For example, referring to Table 3, Table 3 shows a correspondence table between a reference score interval and a timeout coefficient.

TABLE 3

| Reference score interval | Timeout coefficient |
| --- | --- |
| 1-2 points | 70 |
| 3-4 points | 60 |
| 5-6 points | 50 |
| 7 points or more | 40 |

As shown in Table 3, it is assumed that the second reference score obtained by the secondary device by scoring the access status information of the data block group according to the second scoring rule is 1.8, the corresponding first timeout coefficient determined by querying Table 3 is 70, and the heartbeat time sent by the primary device is 2 ms; then, the election timeout time may be set to 70×2 ms=140 ms.

(2) The secondary device obtains a preset reference coefficient and a second weight, where the second weight includes a weight corresponding to each piece of the access status information; calculates a second timeout coefficient of the data block group according to the access status information, the reference coefficient, and the second weight; and sets a product of multiplying the second timeout coefficient by the heartbeat time as the election timeout time.

In the foregoing possible implementation manner, the reference coefficient may be a value obtained by means of machine learning, or may be a preset value. The second weight includes a weight of each piece of the access status information of the data block group. The secondary device may multiply a value corresponding to each piece of the access status information by the weight corresponding to each piece of the access status information, and add together obtained products to obtain a sum. The second timeout coefficient is obtained by adding the reference coefficient to the sum that is obtained by adding together the products. A product of multiplying the second timeout coefficient by the heartbeat time is the election timeout time. The secondary device may set the election timeout time according to the heartbeat time by using the following formulas:

$$OverTime = (weightR \times R + weightW \times W + Reference) \times heartbeatTime;\text{ and}$$

$$weightR + weightW = 1, \text{ where}$$

OverTime is the election timeout time, heartbeatTime is the heartbeat time, Reference is the reference coefficient, R is a value of the read frequency, W is a value of the write frequency, weightR is a weight corresponding to the read frequency, and weightW is a weight corresponding to the write frequency.

For example, in a possible implementation manner, the access status information of the data block group includes the read frequency and the write frequency of the data block group, which are respectively 70 Hz and 45 Hz, corresponding weights are respectively 0.2 and 0.8, the reference coefficient is 15, and the heartbeat time is 2 ms. According to the foregoing solution, an electronic device may calculate the second timeout coefficient, which is 70×0.2+45×0.8+15=65. Therefore, the election timeout time is 65×2 ms=130 ms.

Alternatively, in another possible implementation manner, the heartbeat time is 2 ms, the reference coefficient is 15, the access status information of the data block group includes the read frequency (70 Hz), the write frequency (45 Hz), and the CPU usage (40%), and corresponding second weights are respectively 0.2, 0.6, and 0.2. According to the foregoing solution, an electronic device may calculate the second timeout coefficient, which is 70×0.2+45×0.6+40×0.2+15=64. Therefore, the election timeout time is 64×2 ms=128 ms.

(3) The secondary device sets a product of multiplying a preset reference coefficient by the heartbeat time as the election timeout time.

The secondary device may also directly multiply the reference coefficient by the heartbeat time sent by the primary device, and use a product as the election timeout time.

Similar to step 202, in this embodiment of the present application, the foregoing specific implementation scenarios are merely used as examples for description of a manner in which the secondary device calculates the election timeout time according to the heartbeat time and the access status information of the data block group, and an access status information type and a specific calculation formula are not limited.

The processor 12 in the network device 10 shown in FIG. 1B may run the election initiation module 164l to implement this step.

Step 207: The primary device sends a data synchronization instruction to the secondary device according to the heartbeat time of the data block group.

The processor 12 in the network device 10 shown in FIG. 1B may run the first instruction sending module 164c to implement this step.

Step 208: The secondary device receives the data synchronization instruction sent by the primary device according to the heartbeat time of the data block group.

The processor 12 in the network device 10 shown in FIG. 1B may run the instruction receiving module 164h to implement this step.

Step 209: The secondary device synchronizes data according to the data synchronization instruction.

In this embodiment of the present application, data of all data blocks of a same data block group may be synchronized by means of Log Replication. In a distributed storage system based on a Raft consistency algorithm, after receiving a log (transaction request) of a client, a primary device first supplements the log to a local log, and then synchronizes the log with each secondary device by using a heartbeat. The secondary device sends an acknowledgement response to the primary device after receiving and recording the log. After receiving acknowledgement responses returned by more than a half of secondary devices, the primary device sets the log to being submitted, supplements the log to a local disk, notifies the client, and instructs the secondary device to store the log in a local disk of the secondary device in a next heartbeat.

The processor 12 in the network device 10 shown in FIG. 1B may run the data synchronization module 164i to implement this step.

In addition, the method provided in this embodiment is not limited to being used in a distributed storage system based on a Raft consistency algorithm, and may be further applied to another distributed storage system in which data is synchronized based on a heartbeat time.

In conclusion, in the heartbeat-based data synchronization method provided in the foregoing embodiment, a primary device obtains access status information of a data block group, determines a heartbeat time of the data block group according to the access status information of the data block group, and sends a data synchronization instruction to a secondary device according to the heartbeat time of the data block group, so as to instruct the secondary device to synchronize data. A problem that a signal needs to be frequently received and sent between all storage devices in which a data block group is located, thereby causing relatively large system overheads, and affecting read/write performance of a storage system in an existing Raft consistency algorithm is resolved. Therefore, system overheads of a distributed storage system are reduced, and read/write performance of the storage system is improved.

Figure 3:
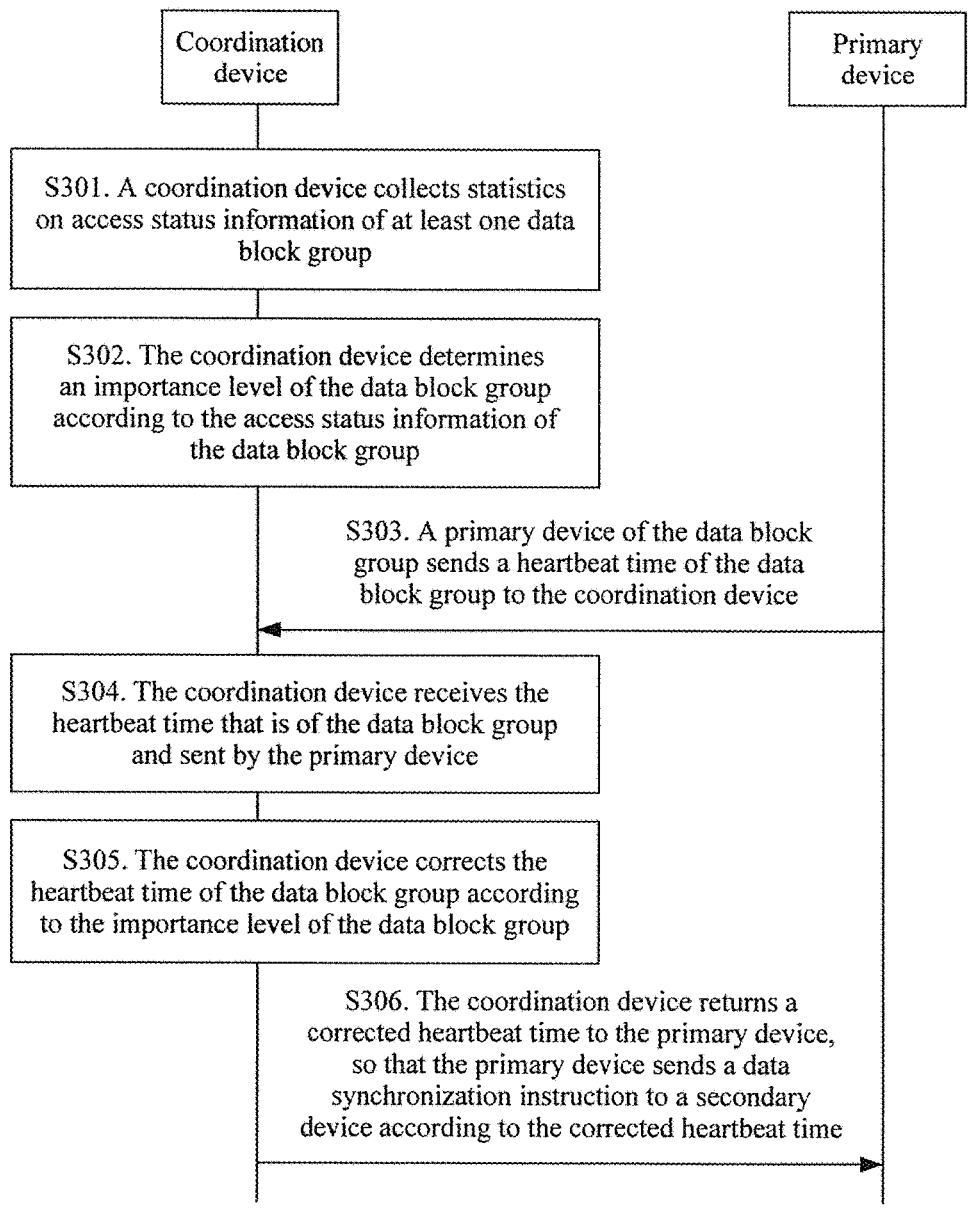
FIG. 3 is a method flowchart of an example of a heartbeat-based data synchronization method according to an embodiment of the present application.

FIG. 3 is a method flowchart of an example of a heartbeat-based data synchronization method according to an embodiment of the present application. The method may be used in the storage system shown in FIG. 1 that includes a coordination device and in which at least one data block group is stored. As shown in FIG. 3, the heartbeat-based data synchronization method may include the following steps.

Step 301: A coordination device collects statistics on access status information of at least one data block group.

The access status information of the at least one data block group may be sent by a respective primary device of the at least one data block group to the coordination device.

The processor 12 in the network device 10 shown in FIG. 1B may run the statistics collection module 164m to implement this step.

Step 302: The coordination device determines an importance level of the data block group according to the access status information of the data block group.

The coordination device may determine the importance level of the data block group according to a sum of a read frequency and a write frequency that are in the access status information of the data block group. For example, referring to Table 4, a read frequency and a write frequency of each data block group, and an importance rank of each data block group in a storage system are listed in Table 4.

TABLE 4

| Data block group name | Read frequency | Write frequency | Sum of read and write frequencies | Importance rank |
|---|---|---|---|---|
| First data block group | 35 Hz | 25 Hz | 60 Hz | 3 |
| Second data block group | 20 Hz | 15 Hz | 35 Hz | 4 |
| Third data block group | 40 Hz | 50 Hz | 90 Hz | 2 |
| Fourth data block group | 55 Hz | 45 Hz | 100 Hz | 1 |

As shown in Table 4, the coordination device calculates sums of respective read and write frequencies of four data block groups, and determines importance of the four data block groups according to values of the sums of the respective read and write frequencies of the four data block groups. A larger sum of read and write frequencies of a data block group indicates higher importance, and a higher corresponding importance rank.

Alternatively, the coordination device may obtain a third weight, and the third weight includes weights respectively corresponding to the read frequency and the write frequency. The coordination device determines an importance level of each data block group according to the read frequency and the write frequency corresponding to each data block group, and the third weight.

The processor 12 in the network device 10 shown in FIG. 1B may run the level determining module 164p to implement this step.

Step 303: A primary device of the data block group sends a heartbeat time of the data block group to the coordination device.

The primary device obtains the access status information of the data block group, and determines the heartbeat time according to the access status information of the data block group. The access status information may include at least two pieces of information including the read frequency and the write frequency of the data block group. For a step in which the primary device determines the heartbeat time according to the access status information of the data block group, refer to description in the embodiment corresponding to FIG. 2, and details are not described herein.

The processor 12 in the network device 10 shown in FIG. 1B may run the second time sending module 164e to implement this step.

Step 304: The coordination device receives the heartbeat time that is of the data block group and sent by the primary device.

The processor 12 in the network device 10 shown in FIG. 1B may run the third time receiving module 164n to implement this step.

Step 305: The coordination device corrects the heartbeat time of the data block group according to the importance level of the data block group.

In a possible implementation manner, a method for correcting the heartbeat time may be as follows: A correction coefficient of the data block group is first determined according to the importance level of the data block group, and then a product of multiplying the correction coefficient by the heartbeat time is determined as a corrected heartbeat time.

For example, if correction coefficients of five data block groups whose importance is in descending order are respectively 0.7, 0.8, 1.0, 1.2, and 1.5, and the heartbeat time is 2 ms, corrected heartbeat times of the five data block groups are respectively 1.4 ms, 1.6 ms, 2 ms, 2.4 ms, and 3.0 ms.

The processor 12 in the network device 10 shown in FIG. 1B may run the correction module 164q to implement this step.

Step 306: The coordination device returns a corrected heartbeat time to the primary device, so that the primary device sends a data synchronization instruction to a secondary device according to the corrected heartbeat time.

The processor 12 in the network device 10 shown in FIG. 1B may run the time return module 164r to implement this step.

In this embodiment of the present application, after generating a heartbeat time, a primary device of a data block group sends the heartbeat time to a coordination device for correction. The primary device sends a data synchronization instruction or a heartbeat signal according to the generated heartbeat time before receiving a corrected heartbeat time returned by the coordination device. The primary device changes to send a data synchronization instruction or a heartbeat signal according to the corrected heartbeat time after receiving the corrected heartbeat time returned by the coordination device. Further, the primary device sends the corrected heartbeat time to a secondary device of the data block group, so that the secondary device of the data block group resets an election timeout time according to the corrected heartbeat time.

In conclusion, in the heartbeat-based data synchronization method provided in this embodiment of the present application, a coordination device collects statistics on access status information of a data block group, determines an importance level of the data block group according to the access status information of the data block group, receives a heartbeat time that is of the data block group and sent by a primary device of the data block group, corrects the heartbeat time of the data block group according to the importance level of the data block group, and returns a corrected heartbeat time to the primary device. A heartbeat time of each data block group is corrected according to a running parameter of each data block group. Therefore, the heartbeat time of each data block group in a storage system is optimized as a whole, and read/write performance of the storage system is further improved.

The following is an embodiment of an apparatus of the present application, and the apparatus may be configured to execute the method embodiment of the present application. For details not disclosed in the apparatus embodiment of the present application, refer to the method embodiment of the present application.

Figure 4:
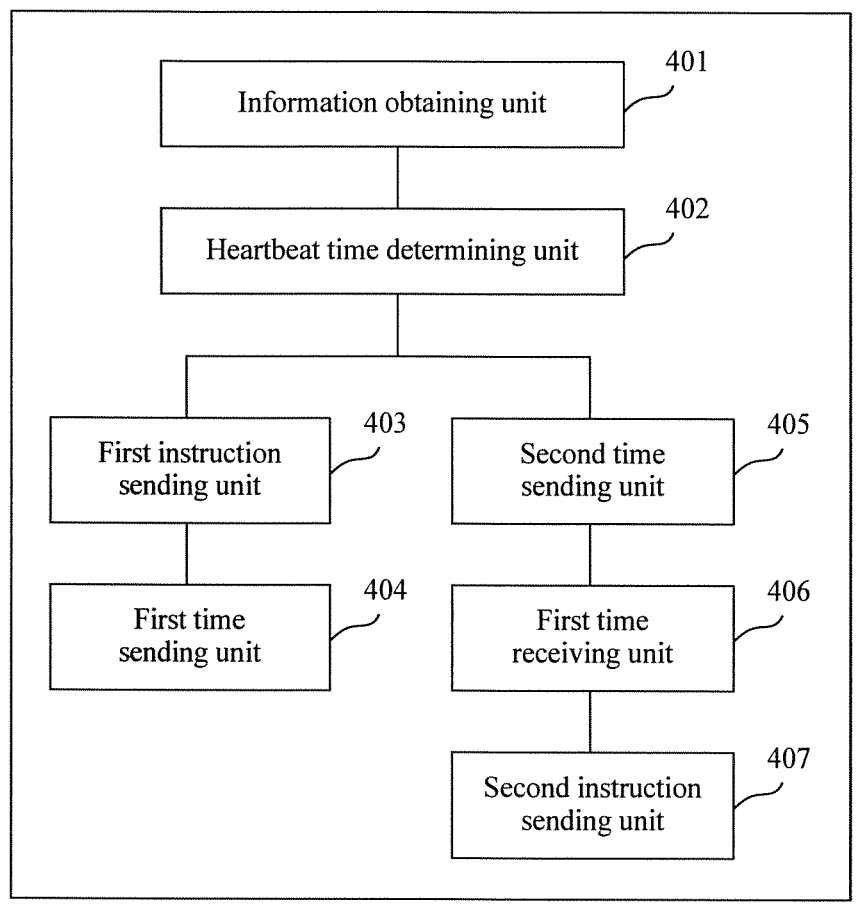
FIG. 4 is a structural block diagram of an example of a heartbeat-based data synchronization apparatus according to an embodiment of the present application.

FIG. 4 is a structural block diagram of a heartbeat-based data synchronization apparatus according to an embodiment of the present application. The heartbeat-based data synchronization apparatus may be implemented as a part or all of a storage device of a distributed storage system by software, hardware, or a combination thereof. The distributed storage system may be the distributed storage system shown in FIG. 1A, and the storage device is a primary device of a data block group. The data block group includes multiple data blocks, and the multiple data blocks are separately stored in multiple storage devices of the distributed storage system. The multiple storage devices include the primary device, and a remaining device in the multiple storage devices except the primary device is a secondary device of the data block group. The heartbeat-based data synchronization apparatus may include an information obtaining unit 401, a heartbeat time determining unit 402, a first instruction sending unit 403, a first time sending unit 404, a second time sending unit 405, a first time receiving unit 406, and a second instruction sending unit 407.

The information obtaining unit 401 has a same or similar function as the information obtaining module 164a.

The heartbeat time determining unit 402 has a same or similar function as the heartbeat time determining module 164b.

The first instruction sending unit 403 has a same or similar function as the first instruction sending module 164c.

The first time sending unit 404 has a same or similar function as the first time sending module 164d.

The second time sending unit 405 has a same or similar function as the second time sending module 164e.

The first time receiving unit 406 has a same or similar function as the first time receiving module 164f.

The second instruction sending unit 407 has a same or similar function as the second instruction sending module 164g.

Figure 5:
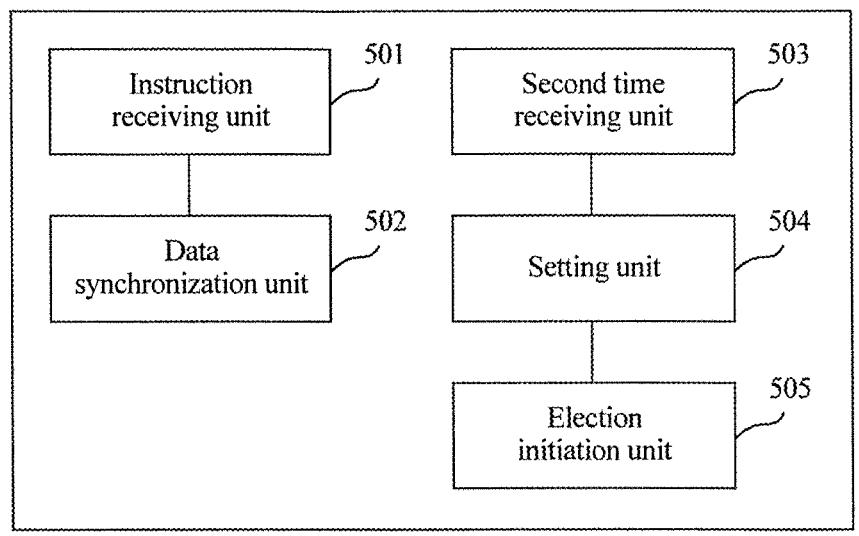
FIG. 5 is a structural block diagram of an example of a heartbeat-based data synchronization apparatus according to an embodiment of the present application.

FIG. 5 is a structural block diagram of a heartbeat-based data synchronization apparatus according to an embodiment of the present application. The heartbeat-based data synchronization apparatus may be implemented as a part or all of a storage device of a distributed storage system by software, hardware, or a combination thereof. The distributed storage system may be the distributed storage system shown in FIG. 1A, and the storage device is a secondary device of a data block group. The data block group includes multiple data blocks, and the multiple data blocks are separately stored in multiple storage devices of the distributed storage system. The multiple storage devices include the secondary device, and a remaining device in the multiple storage devices except a primary device is a secondary device of the data block group. The heartbeat-based data synchronization apparatus may include an instruction receiving unit 501, a data synchronization unit 502, a second time receiving unit 503, a setting unit 504, and an election initiation unit 505.

The instruction receiving unit 501 has a same or similar function as the instruction receiving module 164h.

The data synchronization unit 502 has a same or similar function as the data synchronization module 164i.

The second time receiving unit 503 has a same or similar function as the second time receiving module 164j.

The setting unit 504 has a same or similar function as the setting module 164k.

The election initiation unit 505 has a same or similar function as the election initiation module 164l.

Figure 6:
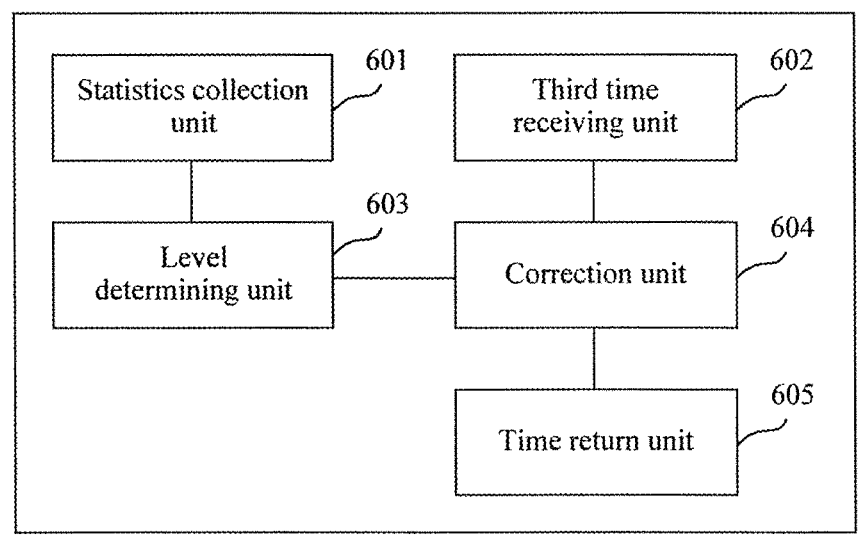
FIG. 6 is a structural block diagram of an example of a heartbeat-based data synchronization apparatus according to an embodiment of the present application.

FIG. 6 is a structural block diagram of a heartbeat-based data synchronization apparatus according to an embodiment of the present application. The heartbeat-based data synchronization apparatus may be implemented as a part or all of a coordination device of a distributed storage system by software, hardware, or a combination thereof. The distributed storage system may be the distributed storage system shown in FIG. 1A, and at least one data block group is stored in the distributed storage system. A data block group includes multiple data blocks, and the multiple data blocks are separately stored in multiple storage devices of the distributed storage system. The multiple storage devices include a primary device, and a remaining device in the multiple storage devices except the primary device is a secondary device of the data block group. The heartbeat-based data synchronization apparatus may include a statistics collection unit 601, a third time receiving unit 602, a level determining unit 603, a correction unit 604, and a time return unit 605.

The statistics collecting 601 has a same or similar function as the statistics collection module 164m.

The third time receiving unit 602 has a same or similar function as the third time receiving module 164n.

The level determining unit 603 has a same or similar function as the level determining module 164p.

The correction unit 604 has a same or similar function as the correction module 164q.

The time return unit 605 has a same or similar function as the time return module 164r.

It should be understood that the singular form "one" ("a", "an", "the") used in the specification is intended to further include a plural form unless the context clearly supports an otherwise case. It should also be understood that "and/or" used in the specification refers to any or all possible combinations of one or more associated listed items.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely examples of the present application, but are not intended to limit the present application. Any modification, equivalent replacement, and improvement made without departing from the spirit and principle of the present application shall fall within the protection scope of the present application.

What is claimed is:

1. A distributed storage system, wherein at least one data block group is stored in the distributed storage system, the distributed storage system comprising:
   multiple storage devices comprising,
      a primary device for storing the data block group and configured to:
         obtain access status information of the data block group,
         determine a heartbeat time of the data block group according to the access status information of the data block group, and
         send a data synchronization instruction according to the heartbeat time of the data block group; and
      a secondary device for storing the data block group and configured to receive the data synchronization instruction and synchronize data according to the data synchronization instruction.

2. The system according to claim 1, wherein the access status information of the data block group comprises a read frequency and a write frequency of the data block group.

3. A heartbeat-based data synchronization method, applied to a distributed storage system, wherein at least one data block group is stored in the distributed storage system, the distributed storage system comprises multiple storage devices including a primary device for storing the data block group and a secondary device for storing the data block group, and the method comprises:
   obtaining, by the primary device, access status information of the data block group;
   determining, by the primary device, a heartbeat time of the data block group according to the access status information of the data block group; and
   sending, by the primary device, a data synchronization instruction to the secondary device according to the heartbeat time of the data block group, wherein the data synchronization instruction is used to instruct the secondary device to synchronize data.

4. The method according to claim 3, wherein the access status information of the data block group comprises a read frequency and a write frequency of the data block group.

5. The method according to claim 3, wherein determining, by the primary device, a heartbeat time of the data block group according to the access status information of the data block group comprises:
scoring, by the primary device, the access status information according to a preset first scoring rule, so as to obtain a first reference score; and
determining, by the primary device, the heartbeat time of the data block group according to the first reference score.

6. The method according to claim 4, wherein determining, by the primary device, a heartbeat time of the data block group according to the access status information of the data block group comprises:
separately scoring, by the primary device, the read frequency and the write frequency according to a first scoring rule;
using, by the primary device, a sum of scores for the read frequency and the write frequency as a first reference score; and
determining, by the primary device, the heartbeat time of the data block group according to the first reference score.

7. The method according to claim 4, wherein determining, by the primary device, a heartbeat time of the data block group according to the access status information of the data block group comprises:
obtaining, by the primary device, a preset reference time and a first weight corresponding to the access status information; and
calculating, by the primary device, the heartbeat time of the data block group according to the access status information, the reference time, and the first weight.

8. The method according to claim 7, wherein determining, by the primary device, a heartbeat time of the data block group according to the access status information of the data block group comprises:
calculating the heartbeat time according to the following formulas:

heartbeatTime=Time/(weight$R$×$R$+weight$W$×$W$); and weight$R$+weight$W$=1, wherein heartbeatTime is the heartbeat time, Time is the reference time, R is a value of the read frequency, W is a value of the write frequency, weightR is a weight corresponding to the read frequency, and weightW is a weight corresponding to the write frequency.

9. The method according to claim 3, further comprising:
sending, by the primary device, the heartbeat time of the data block group to the secondary device, so that the secondary device sets an election timeout time according to the heartbeat time.

10. The method according to claim 3, wherein:
the distributed storage system further comprises a coordination device connected to the multiple storage devices; and
the method further comprises:
sending, by the primary device, the heartbeat time of the data block group to the coordination device,
receiving, by the primary device, a corrected heartbeat time returned by the coordination device, and
sending, by the primary device, a data synchronization instruction to the secondary device according to the corrected heartbeat time.

11. A heartbeat-based data synchronization method, applied to a distributed storage system, wherein at least one data block group is stored in the distributed storage system, the distributed storage system comprises multiple storage devices including a primary device for storing the data block group and a secondary devices for storing the data block group, and the method comprises:
receiving, by the secondary device, a data synchronization instruction sent by the primary device according to a heartbeat time of the data block group, wherein the primary device obtains access status information of the data block group, and determines the heartbeat time according to the access status information of the data block group; and
synchronizing, by the secondary device, data according to the data synchronization instruction.

12. The method according to claim 11, wherein the access status information of the data block group comprises a read frequency and a write frequency of the data block group.

13. The method according to claim 12, further comprising:
receiving, by the secondary device, the heartbeat time sent by the primary device;
setting, by the secondary device, an election timeout time according to the heartbeat time; and
initiating, by the secondary device, a primary device election to at least another storage device of the multiple storage devices when the secondary device does not receive, in the election timeout time, any signal sent by the primary device.

14. The method according to claim 13, wherein setting, by the secondary device, an election timeout time according to the heartbeat time comprises:
scoring, by the secondary device, the access status information according to a preset second scoring rule, so as to obtain a second reference score;
determining, by the secondary device, a first timeout coefficient of the data block group according to the second reference score; and
setting, by the secondary device, a product of multiplying the first timeout coefficient by the heartbeat time as the election timeout time.

15. The method according to claim 13, wherein setting, by the secondary device, an election timeout time according to the heartbeat time comprises:
obtaining, by the secondary device, a preset reference coefficient and a second weight corresponding to the access status information;
calculating, by the secondary device, a second timeout coefficient of the data block group according to the access status information, the reference coefficient, and the second weight; and
setting, by the secondary device, a product of multiplying the second timeout coefficient by the heartbeat time as the election timeout time.

16. The method according to claim 15, wherein setting, by the secondary device, an election timeout time according to the heartbeat time comprises: setting the election timeout time according to the following formulas:

OverTime=(weight$R$×$R$+weight$W$×$W$+Reference)× heartbeatTime; and weight$R$+weight$W$=1, wherein OverTime is the election timeout time, heartbeatTime is the heartbeat time, Reference is the reference coefficient, R is a value of the read frequency, W is a value of the write frequency, weightR is a weight corresponding to the read frequency, and weightW is a weight corresponding to the write frequency.

17. A heartbeat-based data synchronization method, applied to a distributed storage system, wherein at least one data block group is stored in the distributed storage system, the distributed storage system comprises multiple storage devices and a coordination device connected to the multiple storage devices, the multiple storage devices including a primary device for storing the data block group and a secondary device for storing the data block group, the coordination device performs the method, and the method comprises:
  collecting, by the coordination device, statistics on access status information of the data block group, and receiving a heartbeat time of the data block group and sent by the primary device, wherein the primary device obtains the access status information of the data block group, and determines the heartbeat time according to the access status information of the data block group;
  determining, by the coordination device, an importance level of the data block group according to the access status information of the data block group;
  correcting, by the coordination device, the heartbeat time according to the importance level of the data block group; and
  returning, by the coordination device, a corrected heartbeat time to the primary device.

* * * * *